United States Patent
Palatnik de Sousa et al.

(10) Patent No.: US 12,555,562 B2
(45) Date of Patent: Feb. 17, 2026

(54) VOICE SYNTHESIS FROM DIFFUSION GENERATED SPECTROGRAMS FOR ACCESSIBILITY

(71) Applicant: Dell Products L.P., Round Rock, TX (US)

(72) Inventors: Iam Palatnik de Sousa, Rio de Janeiro (BR); Alexander Eulalio Robles Robles, Valinhos (BR); Micael Veríssimo de Araújo, Rio de Janeiro (BR); Sarah Hannah Lucius Lacerda De Góes Telles Carvalho Alves, Rio de Janeiro (BR); Rômulo Teixeira De Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 204 days.

(21) Appl. No.: 18/484,538

(22) Filed: Oct. 11, 2023

(65) Prior Publication Data

US 2025/0124913 A1  Apr. 17, 2025

(51) Int. Cl.
| | |
|---|---|
| *G10L 13/027* | (2013.01) |
| *G10L 13/033* | (2013.01) |
| *G10L 13/04* | (2013.01) |
| *G10L 13/08* | (2013.01) |
| *G10L 15/06* | (2013.01) |
| *G10L 25/18* | (2013.01) |

(52) U.S. Cl.
CPC ........ *G10L 13/027* (2013.01); *G10L 13/0335* (2013.01); *G10L 13/04* (2013.01); *G10L 13/08* (2013.01); *G10L 15/063* (2013.01); *G10L 25/18* (2013.01)

(58) Field of Classification Search
None
See application file for complete search history.

(56) References Cited

U.S. PATENT DOCUMENTS

| | | | | |
|---|---|---|---|---|
| 12,100,383 | B1* | 9/2024 | Ezzerg | G10L 13/047 |
| 2003/0078780 | A1* | 4/2003 | Kochanski | G10L 13/10 |
| | | | | 704/275 |
| 2020/0312296 | A1* | 10/2020 | Agiomyrgiannakis | |
| | | | | G10L 13/10 |
| 2022/0246132 | A1* | 8/2022 | Zhang | G10L 15/063 |
| 2023/0058447 | A1* | 2/2023 | Rosenberg | G06N 3/0455 |

(Continued)

OTHER PUBLICATIONS

Zhang, Chenshuang, et al. "A survey on audio diffusion models: Text to speech synthesis and enhancement in generative ai." arXiv preprint arXiv:2303.13336 (2023). (Year: 2023).*

(Continued)

*Primary Examiner* — Shaun Roberts
(74) *Attorney, Agent, or Firm* — Workman Nydegger (57) ABSTRACT

Techniques for performing voice synthesis from diffusion generated spectrograms are disclosed. A set of curated audio samples is accessed. A set of spectrograms is also accessed. These spectrograms are based on the set of curated audio samples. A synthetic spectrogram is generated by feeding, as input, the set of spectrograms into a diffusion model, which generates the synthetic spectrogram. An audio file is then generated. The audio file is representative of a synthetic voice. The audio file is generated by feeding, as input, the synthetic spectrogram and input text to a text-to-speech model, which generates the audio file.

20 Claims, 9 Drawing Sheets

(56) References Cited

U.S. PATENT DOCUMENTS

| | | | |
|---|---|---|---|
| 2025/0078810 A1* | 3/2025 | Byun | G10L 13/10 |
| 2025/0104291 A1* | 3/2025 | Yamada | G06T 5/70 |
| 2025/0292763 A1* | 9/2025 | Sharma | G06T 13/40 |

OTHER PUBLICATIONS

Huang, Rongjie, et al. "Fastdiff: A fast conditional diffusion model for high-quality speech synthesis." arXiv preprint arXiv: 2204.09934 (2022). (Year: 2022).*

Kang, Minki, Dongchan Min, and Sung Ju Hwang. "Grad-stylespeech: Any-speaker adaptive text-to-speech synthesis with diffusion models." ICASSP 2023-2023 IEEE International Conference on Acoustics, Speech and Signal Processing (ICASSP). IEEE, 2023. ( Year: 2023).*

Mel Spectrogram Explained with Python Code—Amir Masoud Sefidian (archive.org) Mar. 24, 2022.

Betker, Better speech synthesis through scaling, arXiv:2305.07243v2 [cs.SD] May 23, 2023.

Rombach, et al., High-resolution image synthesis with latent diffusion models, arXiv:2112.10752v2 [cs.CV] Apr. 13, 2022.

Radford, et al, 2022. Robust speech recognition via large-scale weak supervision. arXiv:2212.04356v1 [eess.AS] Dec. 6, 2022.

Forsgren et al, "Riffusion-Stable diffusion for real-time music generation. 2022." Riffusion (archive.org).

* cited by examiner

VOICE SYNTHESIS FROM DIFFUSION GENERATED SPECTROGRAMS FOR ACCESSIBILITY

FIELD OF THE INVENTION

Embodiments of the present invention generally relate to facilitating voice synthesis from diffusion generated spectrograms. More particularly, at least some embodiments of the invention relate to systems, hardware, software, computer-readable media, and methods for using a diffusion model to generate any number of synthetic mel-spectrograms to operate as input for generating speech signals.

BACKGROUND

Speech data is used to train various types of machine learning (ML) and deep learning (DL) applications, such as text-to-speech (TTS) or speech recognition (SR).

Those techniques are commonly employed in several user experience enhancing scenarios, as well as for improved accessibility in visual and auditory impairment. Both of those technologies, however, depend directly on the quality of voice and speech data used to train the TTS and SR models. The quality of that data may have an influence or otherwise introduce a bias on the final products such as, for example, TTS systems that can speak only in very specific accents or intonations or SR systems that cannot understand natural variations of accents in languages. The scarcity of fine-grained training data for these variations is a problem. What is needed, therefore, is an improved technique for acquiring training data and for using that training data to generate better models.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

Current TTS models are typically based on DL architectures, and they typically receive inputs not in the form of audio but rather in the form of mel-spectrograms. A traditional spectrogram includes plot data showing frequency versus time characteristics. A mel-spectrogram is similar, but it replaces the frequency axis with a Mel Scale and it uses the decibel scale as opposed to an amplitude scale.

Diffusion Models (DM) are the preferred architecture for synthetic data generation. By leveraging DMs to create synthetic spectrograms, it is possible to generate entire synthetic datasets to train better, less biased, and more personalized TTS and SR models on various accents and dialects of languages. As such, the general domain of the disclosed embodiments is both in synthetic data generation and accessibility.

Various benefits, advantages, and practical applications can be achieved by following the disclosed principles. In particular, the disclosed embodiments are beneficially able to generate synthetic (but realistic) voice data with a set of specific desired characteristics. As another benefit, these synthetic voices can then be used for many downstream tasks where the accent, pitch, tone, or other auditory characteristics of a voice might have an impact on the model's performance or user experience.

Although TTS, SR, and synthetic voice generation are not new technologies, the use of DMs for spectrogram generation (with a particular aim at realistic synthetic voices) is a new concept. It should be noted how the disclosed techniques are distinct from techniques that involve the concatenation of mel-spectrograms generated from text prompts using techniques such as stable diffusion. For instance, the disclosed embodiments are beneficially and uniquely designed to generate spectrograms that are used to generate human voice samples that operate to constrain a downstream task. Such operations are distinct from scenarios in which spectrograms are concatenated through different tools, such as an audio engine.

Spectrograms

Generally, for DL applications involving audio, the audio waveform itself is not used as a direct input to the models. Similar to the preprocessing step in Natural Language Processing (NLP) tasks, the audio is first converted to a representation that can be more easily used by the models during training.

Spectrograms are the representation of choice for DL models in the TTS and SR domains. They include key information on the frequencies that compose the audio waves, in a manageable format. They are typically generated using Fourier-transforms, which decompose waveforms onto their forming frequencies.

Once a spectrogram has been generated from an audio sample, it can be easily visualized as a plot, where the frequencies are displayed as a function of the time passed in the audio file.

Mel-Spectrograms

When it comes to DL applications to human-related audio, such as voice or music, raw spectrograms might not be an ideal representation because they display frequencies in a regular interval on the y-axis. The human ear does not perceive frequencies in this same way, but rather in a nonlinear fashion.

Mel-spectrograms are a re-scaled version of raw spectrograms where the frequencies are adjusted to better correspond to the intervals of human auditory perception. They are the most typically employed representation in applications involving human voice.

Figure 1:
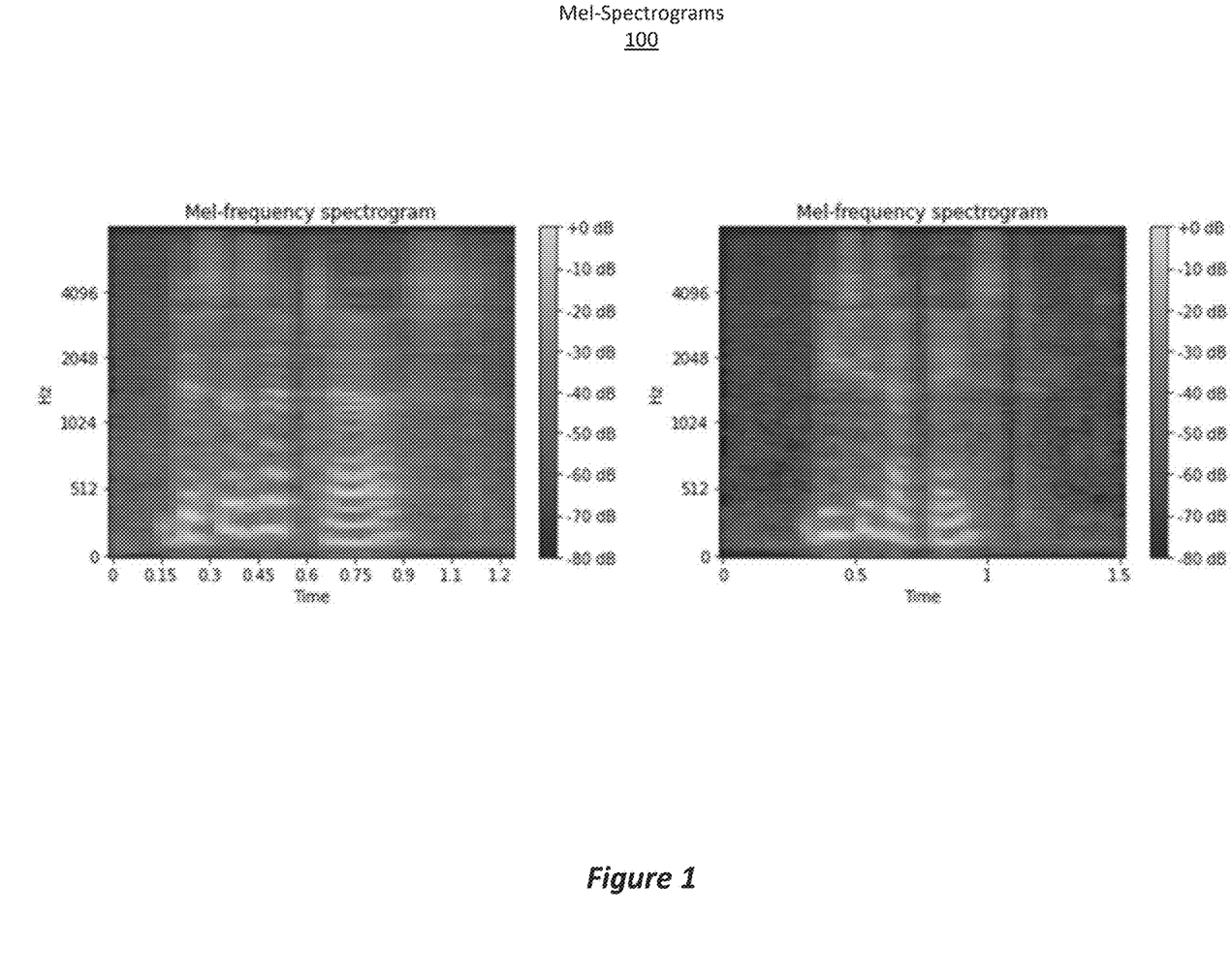
FIG. 1 illustrates various examples of mel-spectrograms.

FIG. 1 shows an example of two mel-spectrograms 100, with the frequency spectrum (y axis) as a function of time (x axis). Both audio sources were recorded by the same voice, speaking the same sentence in English, but with different accents. The resulting mel-spectrograms show slight differences between the frequencies that make up each audio over time. A deep learning model can use these differences for a number of downstream tasks.

Diffusion Models

DMs are a state-of-the-art deep learning architectures for generating synthetic data. Although various types of DMs exist, they all share a basic premise and working mode. Namely, they involve gradually adding small amounts of noise (typically Gaussian) to samples, in a large number of steps, until the sample becomes indistinguishable from pure Gaussian noise. The process of noise addition is highly specific and follows a strict scheduling that is determined from the underlying mathematical formulation of the DMs. This noising process is sometimes termed the "forward diffusion" process.

Subsequently, the reverse process is performed, where the noisiest sample has a small amount of noise removed, generating successively less noisy samples until returning to something that resembles the original sample. Unlike the forward process, which is entirely determined by static equations, the reverse process is learned by a deep learning architecture, most typically a U-net in the case of image applications.

By learning to noise and denoise a training dataset with the forward and reverse processes, the DM is then capable of generalizing by reverting any random noise sample back onto some type of data that resembles the data distribution from the training set. As a simple example, a DM trained with images of red flowers will generate new images of red flowers that are similar but not identical to the ones in the training set. DMs became popular compared to alternatives such as Generative Adversarial Networks (GANs) and Variational Auto Encoders (VAEs) because they yield better quality synthetic data and are less vulnerable to mode collapse, which is when a GAN gets stuck generating similar or identical set of images no matter the input.

The generation process described above is also known as "unconditioned generation." Unconditioned generation essentially means that the DM will generate data randomly, and the user is not able to exert control over the fine characteristics of the synthetic data.

Considering the red flower example again, this means that the users can generate an arbitrary number of red flowers, but they do not have fine control over the number of petals, the size of the flowers, or other such details. In this case, the user can only determine what type of data will be generated by carefully selecting the training set on which the DM will be trained and/or fine-tuned. The dataset (e.g., in this example the images) does not need any annotations, and the task is unsupervised.

On the other hand, generative models can be conditioned in a number of ways in order to impart more user-control on the characteristics of the final synthetic data. There are various methods for generating conditioning (e.g., text prompting, image prompting, loss guidance, Classifier Free Guidance). Regardless of what type of conditioning is used, it should be recognized how DMs can be trained for a conditioned generation task, where users can generate synthetic data with specific desired features.

The major difference from the unconditioned case is that the conditioned generation task typically requires larger datasets, with more varied data distributions and with annotations, such as text prompts that relate to each particular image or input data. Conditioned generation also often requires combining DMs with other DL architectures that can extract representations from the guiding prompts and pass them to the DM's U-net.

So, compared to the unconditioned case, the computational cost of training conditioned generators is higher, and the task is generally more complex. At the same time, however, the conditioned case allows users to have greater control and to have the ability to generalize when creating new synthetic data.

TTS And SR Limitations And Biases

Current DL audio models are capable of processing and generating audio far better than older technologies, leading to extremely realistic sounding voices. Also, they enable the generalization of the audio task by, for instance, performing TTS with a voice that was not originally used to train the model. SR also depends heavily on the characteristics and quality of the training data.

However, both TTS and SR have some limitations in terms of generalization and practical application. In the case of TTS, streamlining the application may be challenging because obtaining guiding voice samples to steer the speech generation requires some audio recording tools. Although reasonably good recording capabilities are typically available even in home-use notebooks and smartphones, voice samples need to be recorded on a one-by-one basis. In addition, users may not be interested in TTS with their voice specifically, but with some voice that resembles theirs in terms of prosody, pitch, and accent.

In the case of SR, a model may have been trained with some type of voice (e.g., some regional English accent), but then the pre-trained model may be required in another setting, where the voice types are different (e.g., another regional English accent). In such a scenario, the pre-trained model may perform poorly at its new location. Although the model can be fine-tuned with some additional training rounds using the target voice type, data may not be available for the fine-tuning training task.

Solutions

The disclosed embodiments aim to address the above limitations of TTS and SR models by generating synthetic data via the use of DMs. As will be discussed in more detail later, two separate pipelines can be used, namely: unconditioned and conditioned. These two pipelines can be connected with the downstream TTS and SR tasks to address the above limitations.

At a high level, the embodiments use DMs to generate spectrograms (e.g., mel-spectrograms) with some particular desired qualities for a given generated voice. For instance, one might imagine a use case of a product where the target audience is Australian, and the desired voice for TTS is the voice of a middle-aged Australian woman.

In accordance with the disclosed principles, a trained DM can be used to generate the spectrogram corresponding to these particular voice qualities. This could be done in two ways, namely: an unconditioned generation technique and a conditioned generation technique.

With the unconditioned generation techniques, the DM can be trained with raw non-annotated samples of voices having specific characteristics (e.g., a middle aged Australian women). After this training, the DM will be able to generate, randomly, an arbitrarily large set of further middle-aged Australian women voices.

With the conditioned generation techniques, a more sophisticated DM, such as Stable Diffusion model, can be used to condition the generation of voices with specific prompts. This model may require a larger annotated dataset, in which voice samples have a corresponding textual description such as "Voice of a 40-year-old woman from Perth." Notice, this annotation recites the following properties, a female, a female of a particular age (or age range), and a female of a particular age located at a specific geographic region.

Once trained, this DM can generate an arbitrarily large set of voices with various characteristics that can be requested by a user via a prompt. Although this model may take more effort to train, it will also give the user more control over the qualities of the final voices. The voices generated by this solution can be directly employed on a given downstream task. One example of such a task includes TTS. Another example includes the use of the model to train TTS and SR models in order to better detect accents, pitch, and tone variations across different age groups and populations.

Regarding conditioned generation, this scenario requires the curation of a dataset. This dataset, however, involves the use of additional annotations and a larger variety of voice characteristics.

To generate this dataset, a number of operations can be performed. One operation involves curating a dataset of audio samples with the desired characteristics. Example characteristics include, but are not limited to, specific age brackets, gender, accent, tone, pitch, and others.

Another operation involves generating textual descriptions for each audio sample. Examples of these textual descriptions may include statements such as "voice of 35-year old man" or "Spanish Language" or "Mexican accent from the Oaxaca region." Notice, these descriptions are not transcripts of the words spoken in the audio file; rather, these descriptions relay information about the characteristics of the voice that is speaking.

Another operation then involves transforming the audio dataset into mel-spectrograms. A conditioned DM (such as Stable Diffusion) is then trained. This training is performed using a pair of data comprising a spectrogram and a corresponding text prompt (e.g., {spectrogram, text prompt}).

Another operation involves generating random synthetic spectrograms using the trained DM. These spectrograms are then passed to a TTS voice generator. The generated voice samples (i.e. the output from the TTS voice generator) can then be used for downstream tasks, such as by fine tuning other TTS or SR models.

Example Architectures

Figure 2:
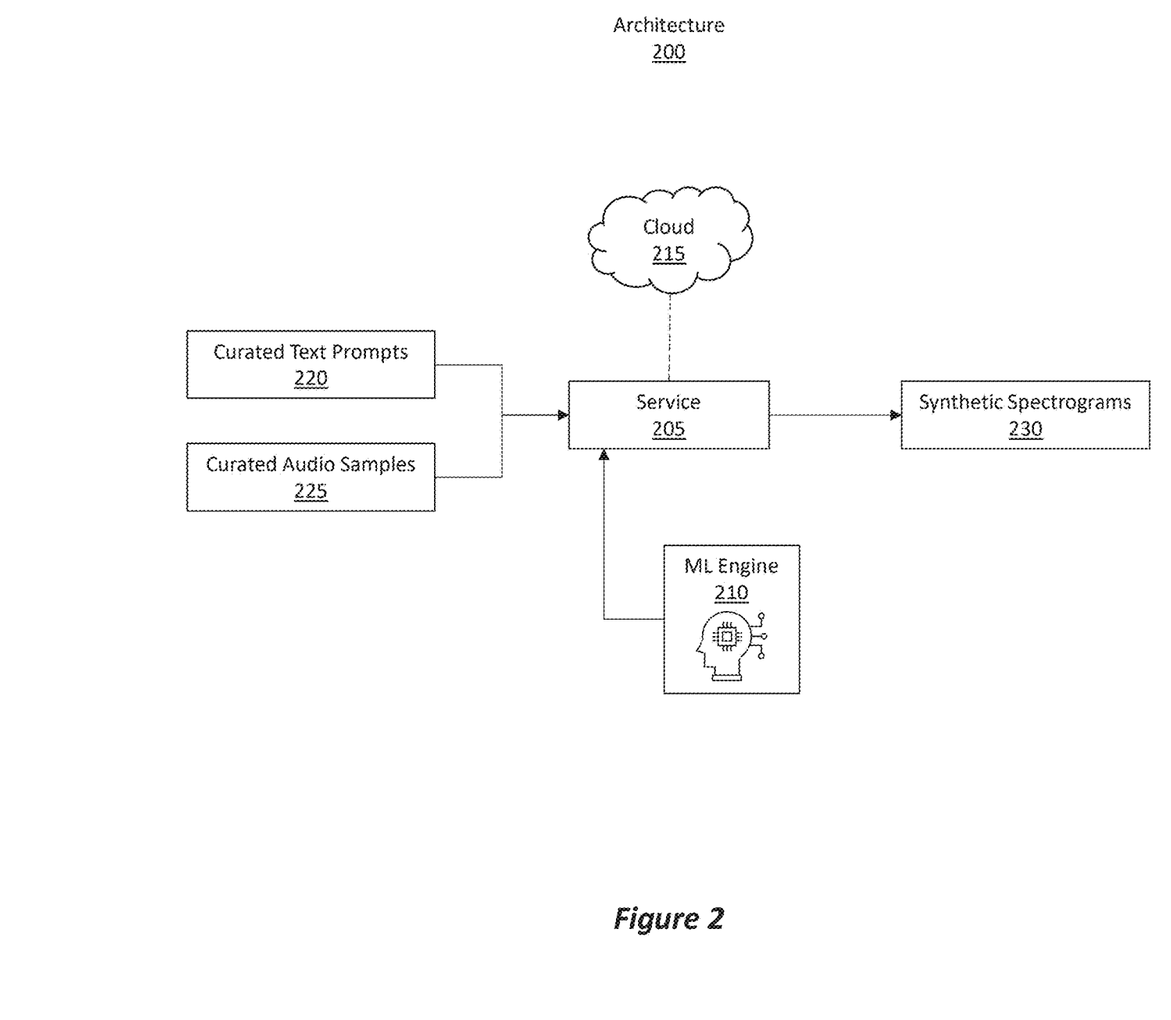
FIG. 2 illustrates an example architecture that can generate synthetic spectrograms.

Attention will now be directed to FIG. 2, which illustrates an example architecture 200 in which the above benefits and operations can be performed. Architecture 200 is shown as including a service 205.

As used herein, the term "service" refers to an automated program that is tasked with performing different actions based on input. In some cases, service 205 can be a deterministic service that operates fully given a set of inputs and without a randomization factor. In other cases, service 205 can be or can include a machine learning (ML) or artificial intelligence engine, such as ML engine 210. The ML engine enables service 210 to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 205 is a cloud service operating in a cloud environment 215. In some implementations, service 205 is a local service operating on a local device. In some implementations, service 205 is a hybrid service that includes a cloud component operating in the cloud and a local component operating on a local device. These two components can communicate with one another.

Figure 3A:
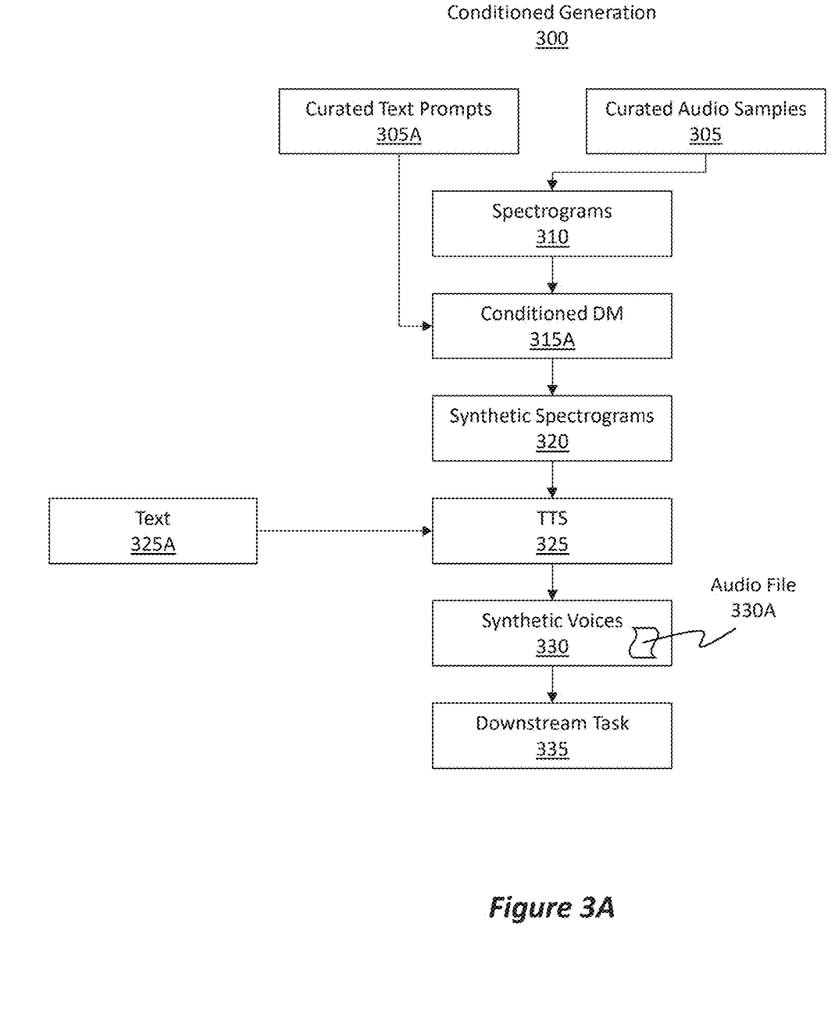
FIGS. 3A, 3B, and 3C illustrate various aspects related to conditioned generation and unconditioned generation of synthetic spectrograms.
Figure 3B:
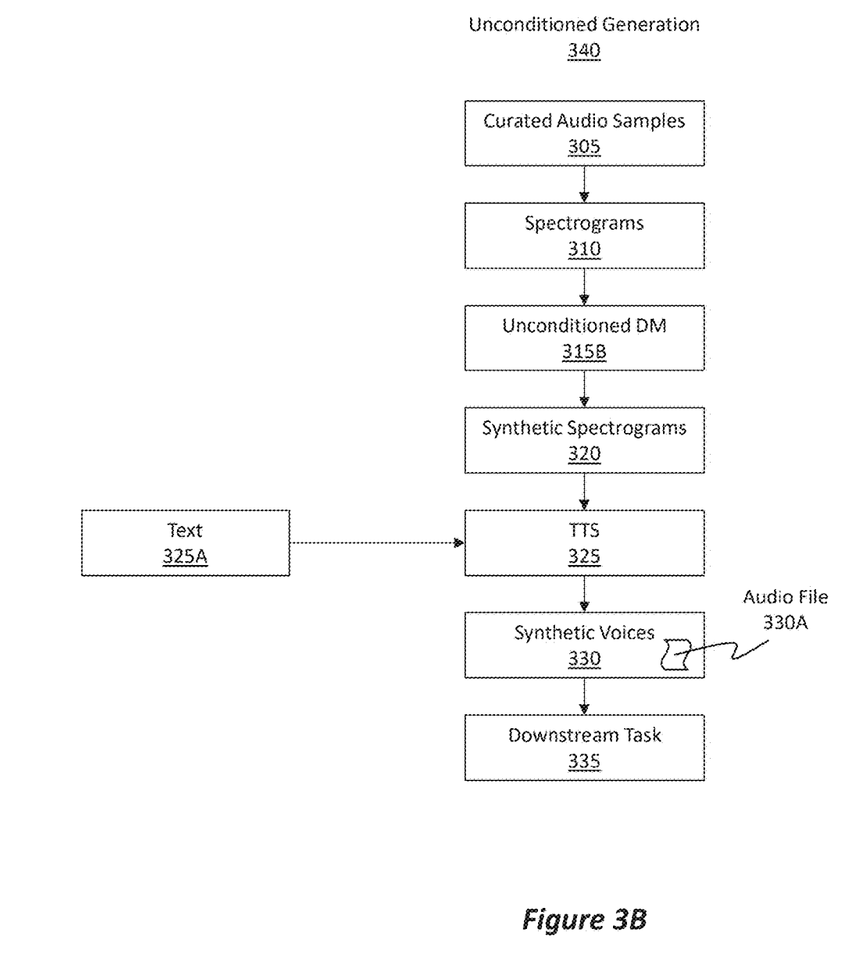

Service 205 is generally tasked with generating synthetic spectrograms to feed as input to a TTS in order to generate synthetic voices. For instance, in some implementations, service 205 receives, as input, curated text prompts 220 and curated audio samples 225. Using this input, service 205 is able to generate a set of synthetic spectrograms 230. FIGS. 3A and 3B provide further details regarding the operations that can be performed or facilitated by service 205. FIG. 3A shows operations that may be performed for the conditioned generation 300 scheme, and FIG. 3B shows operations that may be performed for the unconditioned generation 340 scheme.

FIG. 3A shows a number of operations that may be performed by the disclosed service. Initially, a set of audio samples are obtained, as shown by curated audio samples 305. These audio samples reflect specific characteristics that are desired, such as a voice of a person at a specific age (or age bracket), gender, accent, tone, pitch, or any other specific characteristic.

From these audio samples, a set of spectrograms 320 are then generated. These spectrograms 310 are fed as input into a conditioned DM 315A. Additionally, a set of curated text prompts 305A are fed as input to the conditioned DM 315A. The curated text prompts 305A reflect the characteristics of the voice that are associated with the audio sample(s). To be clear, the curated text prompts 305A are not transcripts of the audio samples; instead, they represent characteristics of the voice that is speaking or providing the audio samples.

As a result, the following input pair can be fed as input: {spectrogram, text prompt}. Using the spectrograms 310 and the curated text prompts 305A, the conditioned DM 315A generates synthetic spectrograms 320. Notably, the conditioned DM 315A may be tasked with generating any number of random synthetic spectrograms based on the provided input.

Traditionally, text and an audio waveform of a specific individual's voice could be fed as input into a TTS model. In other words, a specific user's voice was required as input. The TTS model could then generate speech narrating the text, and the speech would have the characteristics of the voice that was fed as input.

With the disclosed embodiments, there is now no need to have a specific individual's audio sample. Now, the embodiments are able to generate a synthetic sample (or any number of random synthetic samples that generally have the desired characteristics) having characteristics that match the characteristics of a person. Therefore, instead of having to actually obtain a specific person's audio sample, the embodiments are able to synthesize a voice having those characteristics, and that synthesized signal (i.e. the synthetic spectrogram 320) can be fed as input along with desired text. For example, both text 325A and the synthetic spectrograms 320 can be fed as input to the TTS 325. The TTS 325 can then generate synthetic voices 330 (included in an audio file 330A) based on the input. These synthetic voices 330 can then be used for various downstream tasks, as shown by downstream task 335.

FIG. 3A focused on the conditioned generation 300 scenario. FIG. 3B is focused on the unconditioned generation 340 scenario. Notice, most of the operations are the same. The primary differences are that the curated text prompts 305A are not involved or used in the unconditioned generation 340 scenario and, instead of a conditioned DM 315A, an unconditioned DM 315B is used.

Figure 3C:
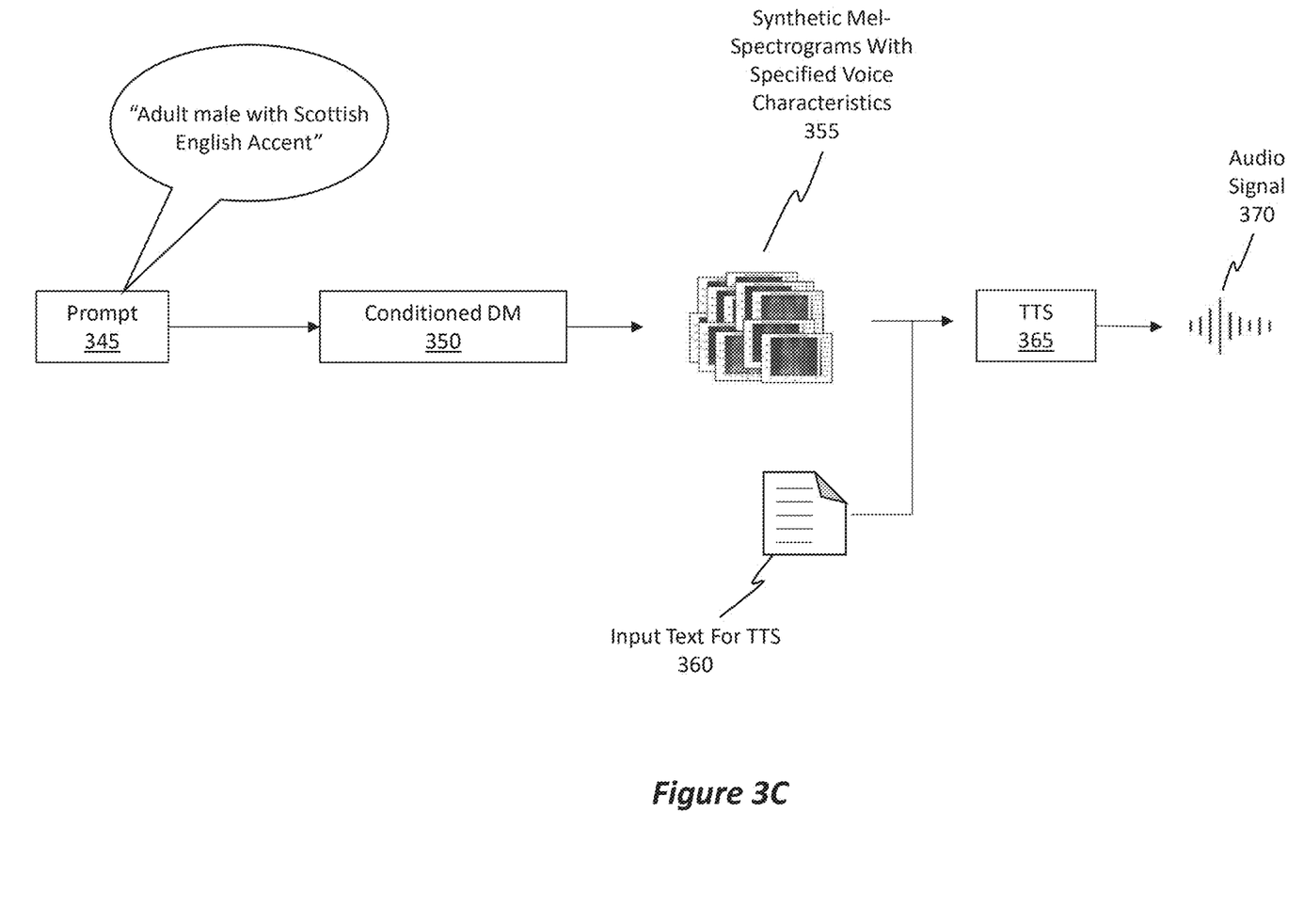

FIG. 3C shows another example of the process flow. A prompt 345 is provided as input to a conditioned DM 350. In this example scenario, it is desirable to generate a voice having the following characteristics: "Adult male with Scottish English Accent." The conditioned DM 350 operates on the prompt 345 and a corresponding input spectrogram (or perhaps any number of input spectrograms) to produce synthetic mel-spectrograms with specified voice characteristics 355. The DM may generate any number of random synthetic spectrograms, with each of those spectrograms having characteristics corresponding to those outlined in the prompt 345.

Those characteristics 355 and input text for TTS 360 are then fed as input to the TTS 365. The TTS 365 then generates an audio signal 370 (or perhaps many), which corresponds to a voice narrating the input text for TTS 360 and having the following characteristics: "Adult male with Scottish English Accent."

TTS Task

In the TTS case, the above discussion addressed the scalability limitation of existing models in which voice samples are required to steer the speech generation with certain voice characteristics. The disclosed embodiments beneficially allow any number of synthetic Mel-spectrograms to be generated from a single text prompt, without requiring any interaction with audio recording tools. Those spectrograms can then be used to steer the TTS model to generate speeches with the characteristics specified on the prompt, as illustrated in FIG. 3C.

Note also that the procedure above does not cause the TTS model to be tied to any particular voice; rather, the embodiments are interested in capturing voice characteristics (e.g., adult male with Scottish English accent) in the spectrogram generation. Any voice combination that satisfies those restrictions will, in principle, generate speeches of acceptable quality.

It should be noted, however, that the TTS itself is trained with voice patterns that at least resemble the characteristics sought after through the text prompts. For example, the prompt above will not generate valid speeches (in the end) if a TTS model has been trained with females from Western Canada only. In other words, the TTS must have enough variability to generate speeches with the requested voice characteristics. In any case, this restriction also applies to the regular TTS approach where voice samples are used to steer the model output.

Downstream Speech Recognition Task

In the SR case, the embodiments address the fine-tuning of a pre-trained model that may be deployed at a location where the voice types associated with the speeches to be recognized were underrepresented in the original training. Fine tuning, in this case, typically requires more data samples of the target voice such that additional training rounds should be performed, and the model naturally improves with the new data.

Collecting the additional data, however, has historically been challenging and costly. The principles described herein address this issue by allowing the generation of large amounts of synthetic data from a single text prompt that specifies the desired voice characteristics. That is, the disclosed DMs are able to generate any number of random synthetic spectrograms that have characteristics corresponding to those characteristics that are desired for the fine tuning operation. This is achieved by employing the TTS model as described above, where some random text excerpts can be transformed into speech with the target voice characteristics. Such speech can then be used as input to the SR for additional training rounds, as illustrated in FIG. 4.

Figure 4:
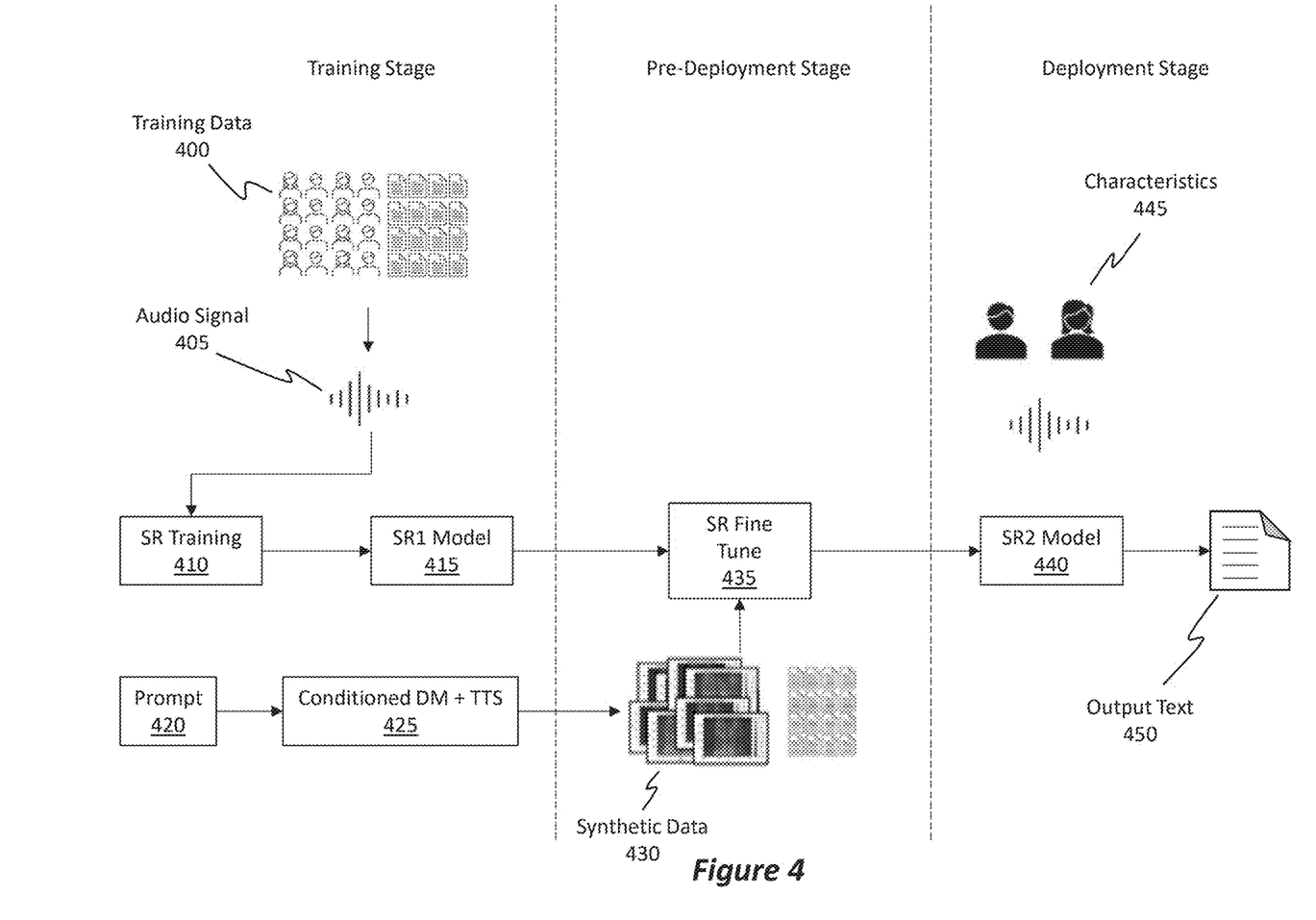
FIG. 4 illustrates a downstream task in which a synthetic voice can be used.

FIG. 4 shows three different stages, namely, a training stage, a pre-deployment stage, and a deployment stage. In the training stage, training data 400 is used to generate an audio signal 405. This audio signal 405 is used during the SR training 410 by the SR1 model 415.

Concurrently, the embodiments are able to feed a prompt 420 to a conditioned DM. The conditioned DM feeds its output to a TTS, as shown by the conditioned DM+TTS 435. These components generate synthetic data 430, which may include synthetic mel-spectrograms with specified voice characteristics plus the synthetic text generated via the TTS. Any amount of synthetic data can be generated by the conditioned DM and TTS pair.

During the pre-deployment stage, the synthetic data 430 is used to fine tune the model, as shown by SR fine tune 435. The embodiments fine tune the model to create a tuned SR2 model 440. This model can be used to generate signals having the desired characteristics 445 during the deployment stage. Similarly, output text 450 can be generated from the SR model.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
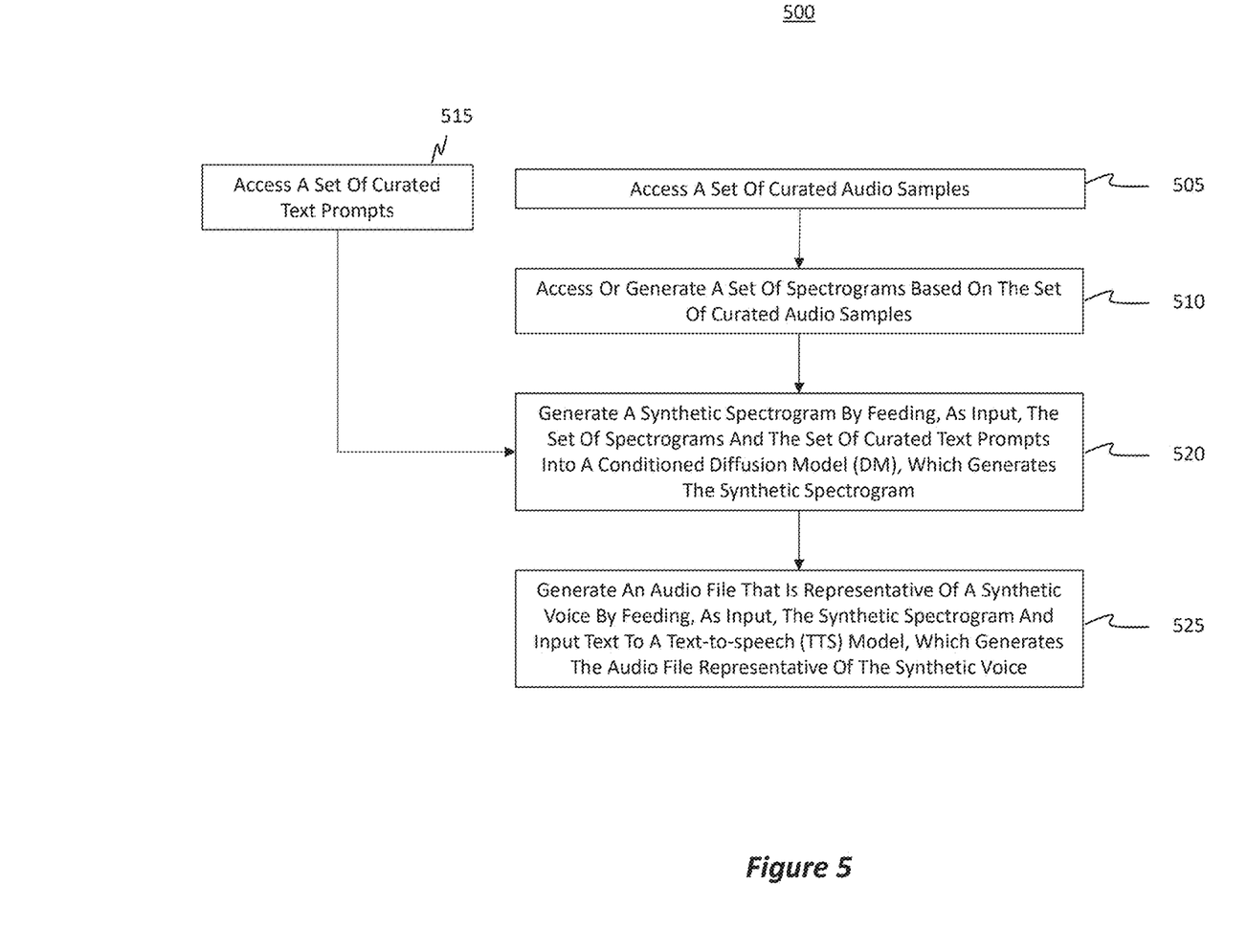
FIG. 5 illustrates a flowchart of an example method for using a conditioned diffusion model to generate synthetic spectrograms.

Attention will now be directed to FIG. 5, which illustrates a flowchart of an example method 500 for performing voice synthesis from diffusion generated spectrograms. Method 500 can be implemented by the service 205 of FIG. 2.

Method 500 includes an act (act 505) of accessing a set of curated audio samples. For example, the curated audio samples 305 from FIG. 3A may be accessed.

Act 510 includes accessing or generating a set of spectrograms based on the set of curated audio samples. For example, the spectrograms 310 from FIG. 3A may be accessed or generated.

Act 515 includes accessing a set of curated text prompts (e.g., the curated text prompts 305A from FIG. 3A). The curated text prompts in the set correspond to or are related to the set of curated audio samples. That is, the set of curated text prompts describe voice characteristics that are embodied in the set of curated audio samples.

Act 520 includes generating a synthetic spectrogram (or any number of random synthetic spectrograms) by feeding, as input, the set of spectrograms and the set of curated text prompts into a conditioned diffusion model (DM), which generates the synthetic spectrogram. In some implementations, the synthetic spectrogram is a synthetic mel-spectrogram. Similarly, in some scenarios, the set of spectrograms is a set of synthetic mel-spectrograms.

The synthetic spectrogram includes data representative of one or more of the following characteristics: a specified age bracket, a specified gender, a specified accent, a specified tone, or a specified pitch. Other speech characteristics can also be included in this list, such as accent, dialect, and so on. In some implementations, the synthetic spectrogram is one of a plurality of synthetic spectrograms that are generated.

Act 525 includes generating an audio file (or perhaps many, depending on the number of synthetic spectrograms that are available) that is representative of a synthetic voice by feeding, as input, the synthetic spectrogram and input text to a text-to-speech (TTS) model, which generates the audio file representative of the synthetic voice.

Method 500 may further include an act of using the audio file, which is a synthetically generated audio file, to fine tune a speech recognition model, as described in FIG. 4. For instance, if multiple audio files are created based on the multiple synthetic spectrograms, then those audio files can be used as a training set to further tune the SR model. Similarly, data can be used to fine tune the TTS model.

Figure 6:
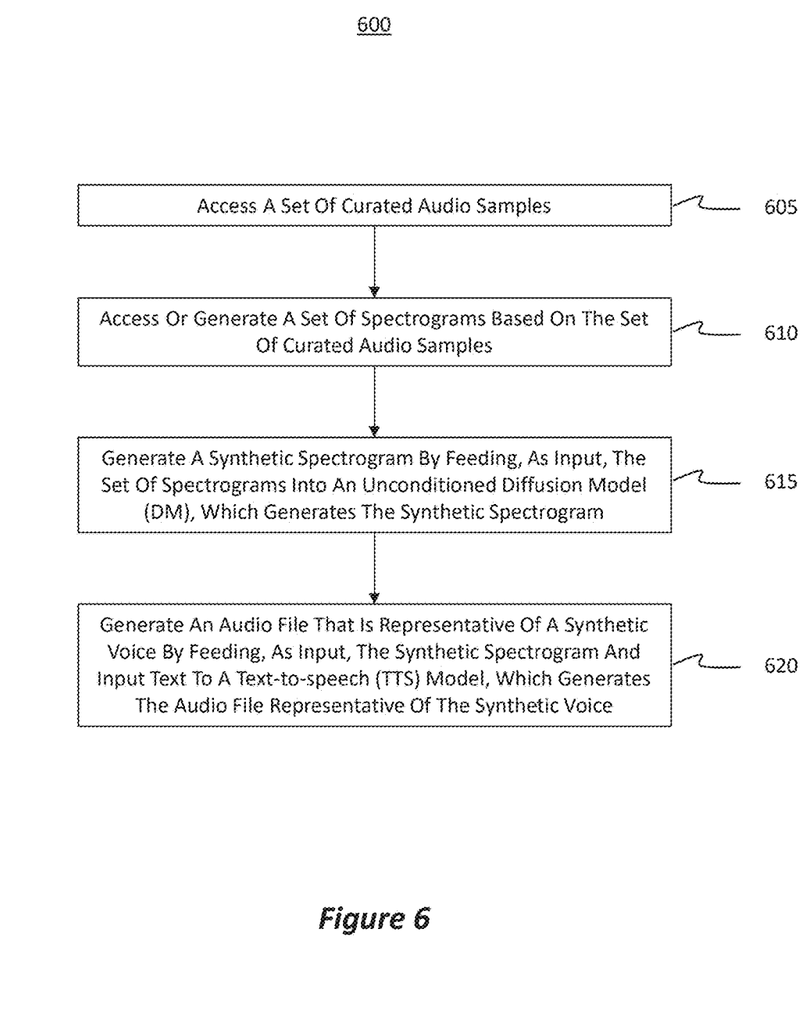
FIG. 6 illustrates a flowchart of an example method for using an unconditioned diffusion model to generate synthetic spectrograms.

FIG. 6 illustrates a flowchart of an example method 600 for performing voice synthesis from unconditioned diffusion generated spectrograms. Method 600 may also be performed by the service 205 of FIG. 2.

Act 605 includes accessing a set of curated audio samples. Act 610 includes accessing or generating a set of spectrograms based on the set of curated audio samples.

Act 615 includes generating a synthetic spectrogram (or multiple) by feeding, as input, the set of spectrograms into an unconditioned diffusion model (DM), which generates the synthetic spectrogram. Act 620 then includes generating an audio file (or multiple) that is representative of a synthetic voice by feeding, as input, the synthetic spectrogram and input text to a TTS model, which generates the audio file representative of the synthetic voice.

Accordingly, the disclosed embodiments are generally directed to techniques for performing voice synthesis from diffusion generated spectrograms. The embodiments are able to access a set of curated audio samples and access or generate a set of spectrograms based on the set of curated audio samples. The embodiments can generate a synthetic spectrogram by feeding, as input, the set of spectrograms into a diffusion model (DM), which generates the synthetic spectrogram. The embodiments then generate an audio file that is representative of a synthetic voice by feeding, as input, the synthetic spectrogram and input text to a text-to-speech (TTS) model, which generates the audio file representative of the synthetic voice.

Example Computer Systems

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. Also, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, client, engine, agent, services, and component are examples of terms that may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
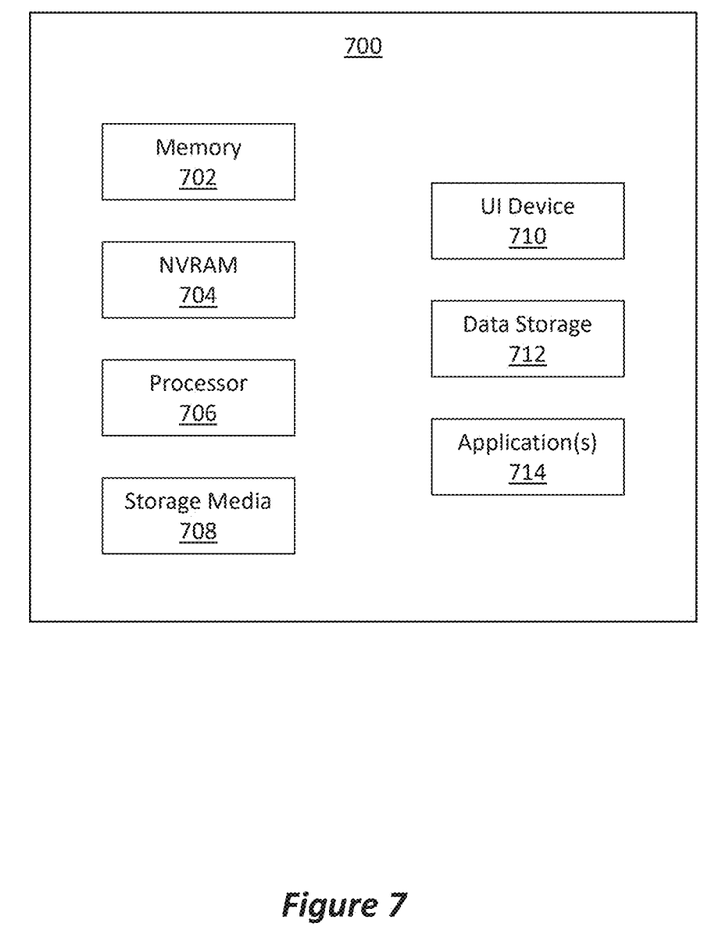
FIG. 7 illustrates an example computer system that can be configured to perform any of the disclosed operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. Also, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The physical device 700 may also be representative of an edge system, a cloud-based system, a datacenter or portion thereof, or other system or entity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
accessing a set of curated audio samples;
accessing or generating a set of spectrograms based on the set of curated audio samples;
generating a synthetic spectrogram by feeding, as input, the set of spectrograms and a corresponding set of curated text prompts into a conditioned diffusion model (DM), where each curated text prompt describes voice characteristics embodied in a corresponding curated audio sample, wherein the conditioned DM generates the synthetic spectrogram, wherein the synthetic spectrogram includes data representative of one or more of the following characteristics: a specified age bracket, a specified gender, or a specified accent, and wherein the conditioned DM has been trained, prior to the generating, using pairs comprising (i) a spectrogram generated from a curated audio sample and (ii) the curated text prompt that describes voice characteristics embodied in that curated audio sample; and
generating an audio file that is representative of a synthetic voice by feeding, as input, the synthetic spectrogram and input text to a text-to-speech (TTS) model, which generates the audio file representative of the synthetic voice.

2. The method of claim 1, wherein the DM is a conditioned DM, and wherein the conditioned DM further receives, as input, a set of curated text prompts, each curated text prompt explicitly describing demographic voice characteristics embodied in a corresponding curated audio sample, such that the conditioned DM generates a synthetic spectrogram constrained to those demographic characteristics.

3. The method of claim 1, wherein the unconditioned DM is trained on raw non-annotated curated audio samples having specified demographic voice characteristics, such that the unconditioned DM generates synthetic spectrograms that reflect those characteristics without receiving text prompts.

4. The method of claim 1, wherein the synthetic spectrogram is a synthetic mel-spectrogram.

5. The method of claim 1, wherein the set of spectrograms is a set of synthetic mel-spectrograms.

6. The method of claim 1, wherein the method further includes using the audio file, which is a synthetically generated audio file, to fine tune a speech recognition model.

7. The method of claim 1, wherein said characteristics further include one or more of: a specified tone, or a specified pitch.

8. A method comprising:
accessing a set of curated audio samples;
accessing a set of curated text prompts, wherein the curated text prompts in the set correspond to the set of curated audio samples in that the set of curated text prompts describe voice characteristics that are embodied in the set of curated audio samples;
accessing or generating a set of spectrograms based on the set of curated audio samples;
generating a plurality of synthetic spectrograms by feeding, as input, the set of spectrograms and the set of curated text prompts into a conditioned diffusion model (DM), which generates the plurality of synthetic spectrograms, each synthetic spectrogram embodying one or more of the voice characteristics described by its corresponding curated text prompt; and
generating a plurality of audio files that are representative of a synthetic voices by feeding, as input, the plurality of synthetic spectrograms and input text to a text-to-speech (TTS) model, which generates the plurality of audio files representative of the synthetic voices.

9. The method of claim 8, wherein the synthetic spectrogram is a synthetic mel-spectrogram.

10. The method of claim 8, wherein the set of spectrograms is a set of synthetic mel-spectrograms.

11. The method of claim 8, wherein the method further includes using the audio file to fine tune a speech recognition model.

12. The method of claim 8, wherein the synthetic spectrogram includes data representative of one or more of the following characteristics: a specified age bracket, a specified gender, a specified accent, a specified tone, or a specified pitch.

13. The method of claim 8, wherein the plurality of synthetic spectrograms includes at least three different spectrograms respectively embodying distinct demographic voice characteristics described by different curated text prompts.

14. The method of claim 8, wherein the set of spectrograms are generated.

15. A method comprising:
   accessing a set of curated audio samples;
   accessing or generating a set of spectrograms based on the set of curated audio samples;
   generating a plurality of synthetic spectrograms by feeding, as input, the set of spectrograms into an unconditioned diffusion model (DM), which generates the plurality of synthetic spectrograms, wherein the unconditioned DM has been trained, prior to the generating, with raw non-annotated audio samples of voices having specific characteristics, and is thereby configured to generate synthetic spectrograms reflecting those specific characteristics without using text prompts; and
   generating a plurality of audio files that is representative of a synthetic voices by feeding, as input, the synthetic spectrogram and input text to a text-to-speech (TTS) model, which generates the plurality of audio files representative of the synthetic voices.

16. The method of claim 15, wherein the synthetic spectrogram is a synthetic mel-spectrogram.

17. The method of claim 15, wherein the set of spectrograms is a set of synthetic mel-spectrograms.

18. The method of claim 15, wherein the method further includes using the audio file to fine tune a speech recognition model.

19. The method of claim 15, wherein the synthetic spectrogram includes data representative of one or more of the following characteristics: a specified age bracket, a specified gender, a specified accent, a specified tone, or a specified pitch.

20. The method of claim 15, wherein the plurality of synthetic spectrograms includes synthetic spectrograms generated to represent different subsets of demographic voice characteristics present in the curated audio samples, thereby expanding coverage of underrepresented voices in the aggregated training corpus.

* * * * *